United States Patent [19]
Luciano et al.

[11] Patent Number: 5,763,874
[45] Date of Patent: Jun. 9, 1998

[54] INCREMENTAL OPTICAL ENCODER HAVING PARTIALLY OPAQUED QUADRATURE DETECTORS

[75] Inventors: Antognini Luciano, Corcelles/Ne; Christophe Dayer, La Chaux-de-Fonds; Roger Lagger, Les Hauts-Geneveys, all of Switzerland

[73] Assignee: PORTESCAP, La Chaux-de-Fonds, Switzerland

[21] Appl. No.: 609,988

[22] Filed: Feb. 29, 1996

[30] Foreign Application Priority Data

Mar. 1, 1995 [CH] Switzerland ............... 577/95

[51] Int. Cl.$^6$ .................................... G01D 5/34
[52] U.S. Cl. ................ 250/231.14; 250/231.16; 250/231.18
[58] Field of Search ............ 250/231.16, 231.18, 250/231.14

[56] References Cited

U.S. PATENT DOCUMENTS

| 4,451,731 | 5/1984 | Leonard | 250/237 SE |
|---|---|---|---|
| 4,559,524 | 12/1985 | Suzuki . | |
| 4,654,524 | 3/1987 | Kita | 250/231 SE |
| 4,691,101 | 9/1987 | Leonard | 250/231 SE |
| 4,945,231 | 7/1990 | Ohya et al. | 250/231.14 |
| 4,998,013 | 3/1991 | Epstein et al. | 250/214 C |
| 5,254,919 | 10/1993 | Bridges et al. | 318/560 |

FOREIGN PATENT DOCUMENTS

| 1248598 | 10/1971 | United Kingdom . |
| 2057676 | 4/1981 | United Kingdom . |
| 2229812 | 10/1990 | United Kingdom . |

*Primary Examiner*—Edward P. Westin
*Assistant Examiner*—Kevin Pyo
*Attorney, Agent, or Firm*—Woodard, Emhardt, Naughton, Moriarty & McNett

[57] ABSTRACT

An optical encoder having a detector device including four light detectors, each formed of an elongated light sensitive surface. Free zones of this surface alternate with zones covered by an opaque layer arranged so that the cooperation of the light detectors with an encoder disc which leads to the delivery of output signals in phase quadrature, each light detector generating an output signal of a single phase.

5 Claims, 4 Drawing Sheets

INCREMENTAL OPTICAL ENCODER HAVING PARTIALLY OPAQUED QUADRATURE DETECTORS

BACKGROUND AND SUMMARY OF THE INVENTION

The present invention relates to incremental optical encoder devices for measuring an angle of rotation or a linear displacement of a movable member as a function of time and for determining the direction of such movements.

Known devices for measuring the angle of rotation of a rotating member comprise, for example, a light source, a disc which is secured to the rotating member and is arranged for producing a modulation of light by means of windows, i.e. by zones which allow passage of the light through them alternating with opaque zones, a mask arranged close to the disc also provided with light transmissive zones and opaque zones, and a detection device including light detectors. By placing the mask corresponding to the different light detectors according to an appropriate pattern, output signals in quadrature are produced the frequency of which corresponds to the number of alternations of opaque zones and of light transmissive zones.

The devices of this type have however the drawback of comprising a mask, the precision in positioning of which is essential for a good operation of the encoder. Actually, the width of the windows and of the opaque portions of the rotating disc can be smaller than 100 μm and therefore the mask has to be positioned with a very high precision, as well axially as radially.

A solution of this problem resides in multiplying the number of light detectors and in arranging them in radially juxtaposed groups. The detectors are shifted by 90° electrical and their signals can be combined to obtain signals in quadrature. Such an arrangement, however, has the disadvantage of being specific for a given resolution and given dimensions of the rotating disc. Accordingly, in order to provide an encoder of similar dimensions, but for a different resolution, it is necessary to produce in each case a specific integrated circuit which results in corresponding costs.

It is an object of the present invention to provide a precise and reliable incremental optical encoder which does not require the positioning of a mask, such as mentioned above, and which can be manufactured in a more economic way than encoders of the prior art.

This is achieved according to the invention by providing an incremental optical encoder device comprising a light source emitting a light beam along an optical path, an encoder plate secured to the movable member and provided with a series of opaque zones and of light transmissive zones arranged so as to cross the optical path and to modulate the light beam upon movement of the encoder plate, and comprising detection means including at least one group of four light detectors, each detector having a light-sensitive surface arranged to receive the modulated light beam, the detection means being arranged for generating output signals in quadrature upon movement of the encoder plate, in which each of said light-sensitive surfaces comprises at least one zone covered by an opaque layer and an adjacent free zone in such a manner that the four light detectors generate said output signals in quadrature, each light detector generating an output signal of a single phase.

The opaque layer which may be applied directly onto the light detectors avoids the use of an additional mask between the light detectors and the encoder plate.

Furthermore, the matrix formed by the opaque layer and the light-sensitive surfaces of the light detector has the advantage that it can be realized in the form of an integrated circuit and can easily be adapted to different resolutions of an optical encoder by simply changing the configuration of the opaque layer.

In an embodiment of the invention in which the movable member is rotating around an axis and the encoder plate is in the form of a coaxially arranged disc, the light-sensitive surfaces of the detector form each substantially a plane quadrilateral comprising two segments of concentric circles, the centres of which are the point of intersection of the plane of the light-sensitive surface with the axis of rotation of the disc.

According to another preferred embodiment, each of the light-sensitive surfaces forms substantially a rectangle, the large sides of all of the different rectangles being substantially parallel to each other.

The opaque layer is preferably made by metallization.

According to a preferred embodiment, the detection means comprise at least a first and a second group of four light detectors and means for combining the output signals generated by the light detectors of the first group with the output signals generated by the respective light detectors of the second group, at least one light detector of the first group and a corresponding one of the second group which generates signals of same phase, being arranged at different locations spaced inside the light beam.

Another drawback of incremental optical encoders of the prior art is their requirement to be constantly energized in order to supply a position information, even when the movement to be detected is stopped. This may be particularly troublesome in the case of portable devices which are energized by a battery. It is also to be noted that in certain applications, in particular in medical appliances, the motor which is associated with the encoder is stopped over the greater part of the time and the encoder itself is only used for periodic monitoring.

Another object of the present invention is therefore to overcome the drawback resulting from a constant energizing of an encoder, and thereby to save considerable energy.

To achieve this, an incremental optical encoder device according to the invention comprises memory means having inputs coupled to receive logical signals derived from the output signals from the detection means, the memory means being arranged for storing the states of the logical signals appearing at the inputs at the time the memory means receive the control signal and for holding outputs of the memory means in the logical states corresponding to the stored logical states of the inputs.

According to a preferred embodiment, such an encoder device comprises a circuit for interrupting the energization of the light source and/or of the detection means under the action of said control signal.

Further aspects, objects and advantages of the invention will become apparent from the following description of various embodiments of optical encoder devices according to the invention.

BRIEF DESCRIPTION OF THE DRAWINGS

FIG. 8b shows the logical states of the signals appearing at different locations of the circuit of FIG. 8a;

FIG. 9b shows the logical states of the signals appearing at different locations of the circuit of FIG. 9a.

DETAILED DESCRIPTION OF PREFERRED EMBODIMENTS

Figure 1:
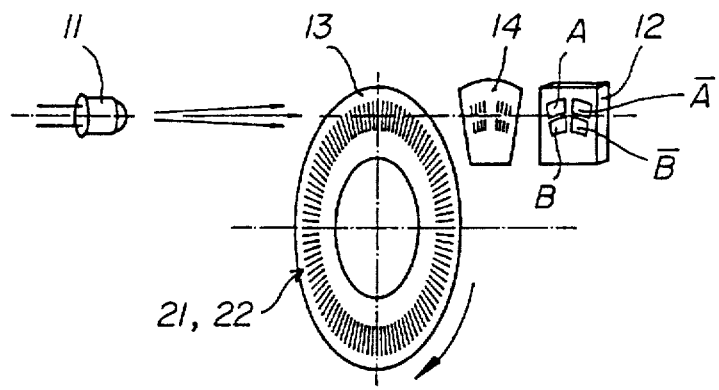
FIG. 1 shows the structure of an optical encoder of the prior art.

FIG. 1 shows an optical encoder of the prior art which comprises a light source 11 delivering a beam of light which is directed toward light detectors A, $\overline{A}$, B, $\overline{B}$ of a detection device 12. The light of each light channel which impinges onto a corresponding light detector is modulated by slots 22 of a rotatable encoding disc 13 in association with a mask 14. The disc 13 is secured to a member not shown which rotates about the same axis as the disc 13 and of which it is desired to obtain information relating to its rotation.

Figure 2:
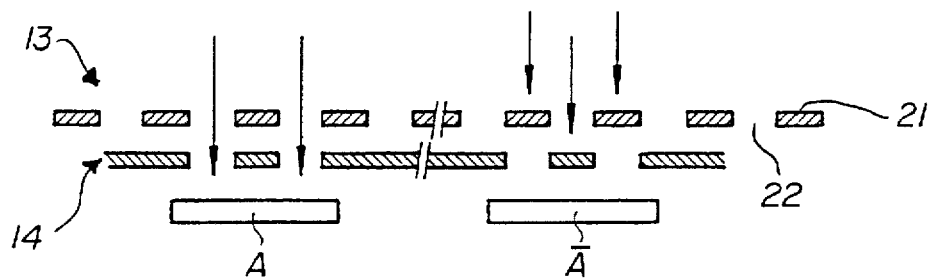
FIG. 2 illustrates the principle of modulation of a light beam as a function of the position of the encoder plate.

The principle of the above mentioned modulation is illustrated in FIG. 2 for a pair of light detectors A and $\overline{A}$, each being respectively associated to a corresponding light channel. A similar representation can be made for corresponding light detectors B and $\overline{B}$ or for any other channel.

Rotation of disc 13 having slots or windows 22 and opaque bars 21, with respect to the stationary mask 14 results in a cyclical modulation of the light impinging onto the light detectors A and $\overline{A}$. Thus the light detectors will deliver signals A and $\overline{A}$ as a function of the angle of rotation α in accordance with the graph of FIG. 4. The arrangement is such that the modulation of light received by the light detector A is in opposite phase to the modulation of light received by the light detector $\overline{A}$. The same principle applies to the light detectors B and $\overline{B}$, so that the signals A, B, $\overline{A}$, $\overline{B}$ are in quadrature, in other words, they are identically shaped and are 90° out of phase with each other. In the case of high resolution encoders, the mutual positioning of the disc 13, the mask 14 and the light detectors of the detection device 12 is a delicate operation.

Figure 4:
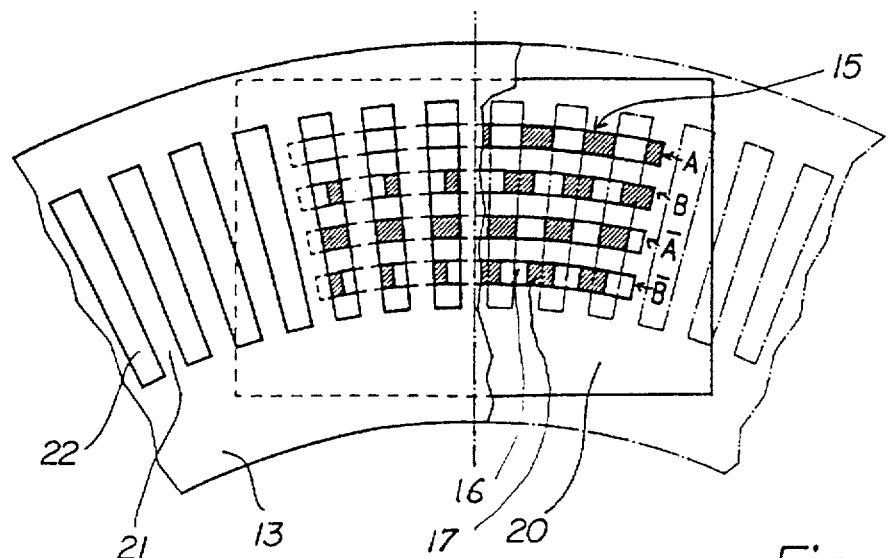
FIG. 4 illustrates an embodiment of a matrix of light-sensitive surfaces as used in the present invention and a corresponding encoding disc having windows and opaque bars.

This disadvantage is eliminated in the optical encoders according to the present invention, a preferred embodiment of which is illustrated by FIG. 4. The left-hand portion of this figure shows, in dotted lines, parts not visible in front view, while the right-hand portion shows these parts with the disc 13 broken away.

In this embodiment, elongated light-sensitive surfaces such as 15, shown as a series of hatched quadrangles in FIG. 4, form respective light detectors A, B, $\overline{B}$, $\overline{B}$. The different quadrangles of these detectors are each defined in the direction of their width by two segments of concentric circles the centres of which are on the point of intersection of the plane of the light-sensitive surfaces and of the axis of rotation of the disc 13 which is similar to the disc 13 of FIG. 1 with its windows 22 and opaque bars 21. The detection device 20 which comprises the light-sensitive surfaces 15 is preferably made in the form of an integrated circuit by which a very great dimensional precision can be obtained. The length of the light-sensitive surfaces of each light detector corresponds to a plurality of electrical cycles and each light detector receives light passing through a plurality of windows 22 of the disc 13.

Figure 3:
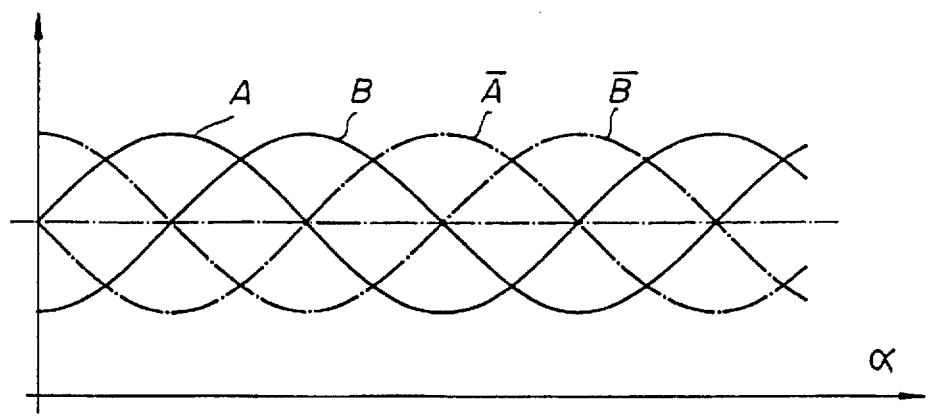
FIG. 3 shows the signals produced by a detection device comprising four light detectors.

The different light-sensitive surfaces are partially covered by an opaque layer, typically a metallized layer, which forms opaque zones 17 and leaves free zones 16, the zones 16 and 17 having widths substantially equal to those of the windows 22 and of the opaque bars 21 of the disc 13. The zones 16 and 17 of the different light-sensitive surfaces belonging, respectively, to the detectors A, B, $\overline{A}$, $\overline{B}$ are shifted by an angle of 90°(electrical) with respect to the adjacent zones. Thus, at the output of each light detector, signals are obtained which are phase-shifted by 90°(electrical) as shown in FIG. 3.

Figure 5:
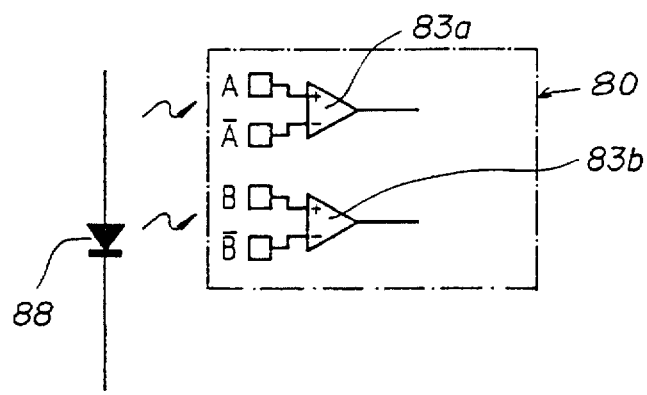
FIG. 5 shows a part of an electrical circuit of a detection device according to the invention.

FIG. 5 schematically shows a detection device 80 arranged for deriving logical signals from the signals delivered by the light detectors which receive the light emanating from the light source of the device which has the form of a photodiode 88. The light detectors A and $\overline{A}$ are connected to a comparator 83a, while the light detectors B and $\overline{B}$ are connected to a comparator 83b, said comparators delivering corresponding logical signals.

Figure 6:
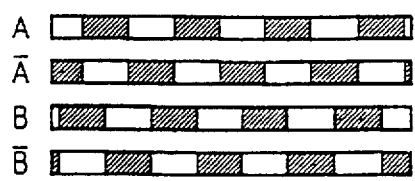
FIG. 6 shows an alternative embodiment of a matrix partially covered by an opaque layer.

The light-sensitive surfaces of the light detectors may have a rectangular shape so that they are easier to manufacture in the form of integrated circuits. Such a form, as shown in FIG. 6, further makes it possible to use such light detectors on discs of different diameters and are advantageously used for linear optical encoders. In the case of a rotatable disc, such as 13, the dimensions of the rectangular metallized zones can be adapted so as to take into account the curvature effect resulting from the use of such a disc.

Figure 7:
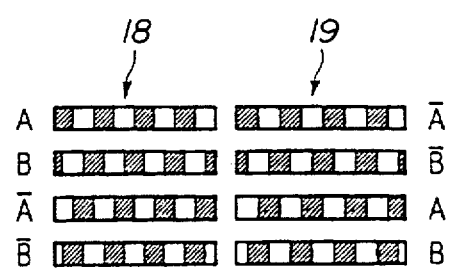
FIG. 7 illustrates another embodiment of a matrix of light-sensitive surfaces.

FIG. 7 represents another embodiment of an assembly of light-sensitive surfaces according to the invention in the form of a matrix. In FIG. 7, the detection device comprises a first group 18 and a second group 19 of light detectors, each formed by four light detectors A, B, $\overline{A}$, $\overline{B}$. The signals generated by corresponding light detectors, i.e. light detectors identified by the same reference A, B, $\overline{A}$, $\overline{B}$ are added up in the encoder device. As will be seen from FIG. 7, such corresponding light detectors of the first and second groups are arranged at different locations in a transverse direction so that any non-uniformity of light intensity over the cross-section of the light beam will be compensated.

Figure 8A:
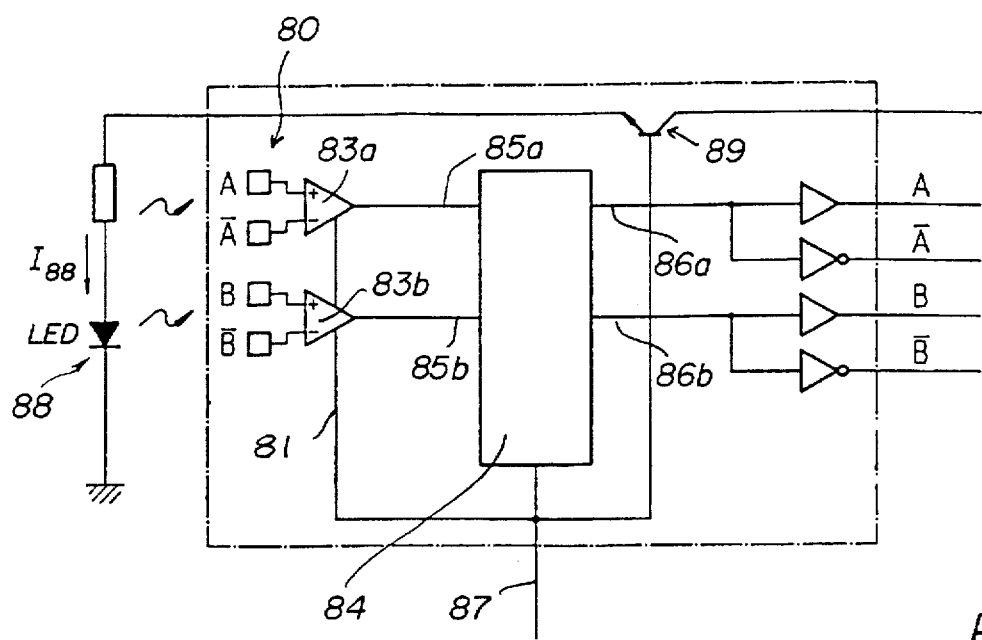
FIG. 8a shows the electrical diagram of an embodiment of an optical encoder which comprises a memory device.
Figure 8B:
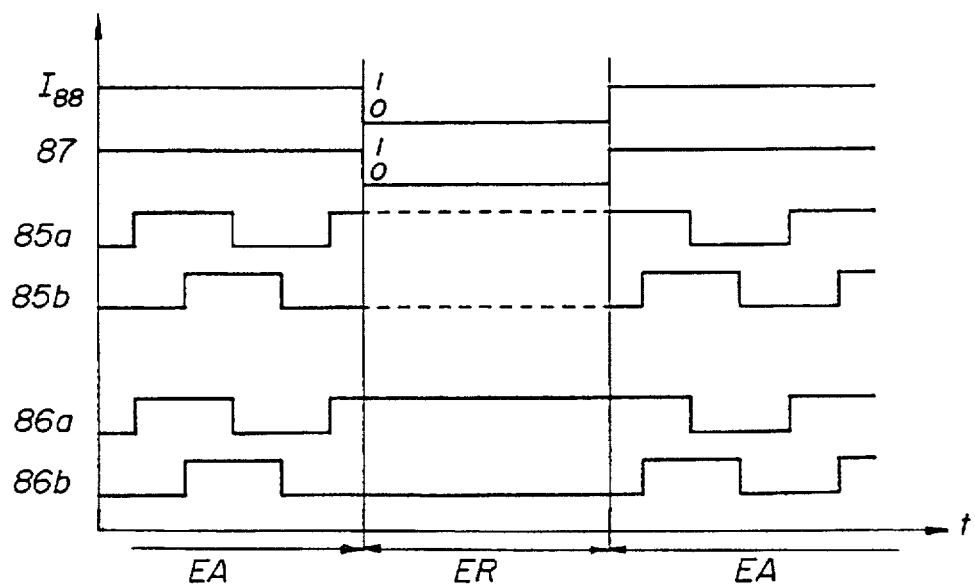

FIGS. 8a and 8b show, respectively, an embodiment of the electrical circuit of the present encoder and the logical states of the signals at different points of this circuit. According to this embodiment, the encoder comprises a memory device 84 connected to the detection device 80. The logical signals generated by the comparators 83a and 83b, are applied to inputs 85a and 85b of the memory device 84 which is activated by means of a control signal delivered over a line 87. When the control signal is in the logical state "1", outputs 86a and 86b of the memory device 84 are in the same logical states as the corresponding inputs 85a and 85b. When the control signal at 87 turns into the logical state "0", the memory device 84 stores the logical states of the inputs 85a and 85b existing at this moment and the outputs 85a and 86b are maintained in the stored states corresponding to those of these inputs.

The above mentioned control signal is also used to interrupt energization of the light source 88, here represented as a LED diode, by means of a power transistor 89, as well as to cut off the energization of the comparators 83a and 83b, via a line 81.

As a consequence, when the mechanical system connected to the encoder is inoperative, the power consumption of the encoder can be reduced in a substantial manner by imposing a logical "0" state to the control signal at 87, while the previous states of the encoder's inputs are preserved in the memory device 84. FIG. 8b illustrates the operation of the circuit of FIG. 8a in active states EA and in a stand-by state ER of the encoder device. The current feeding the light source 88 is indicated by $I_{88}$, the state "1" thereof referring to the on-state of the light source, and the "0" to the cut-off of the same.

Figure 9A:
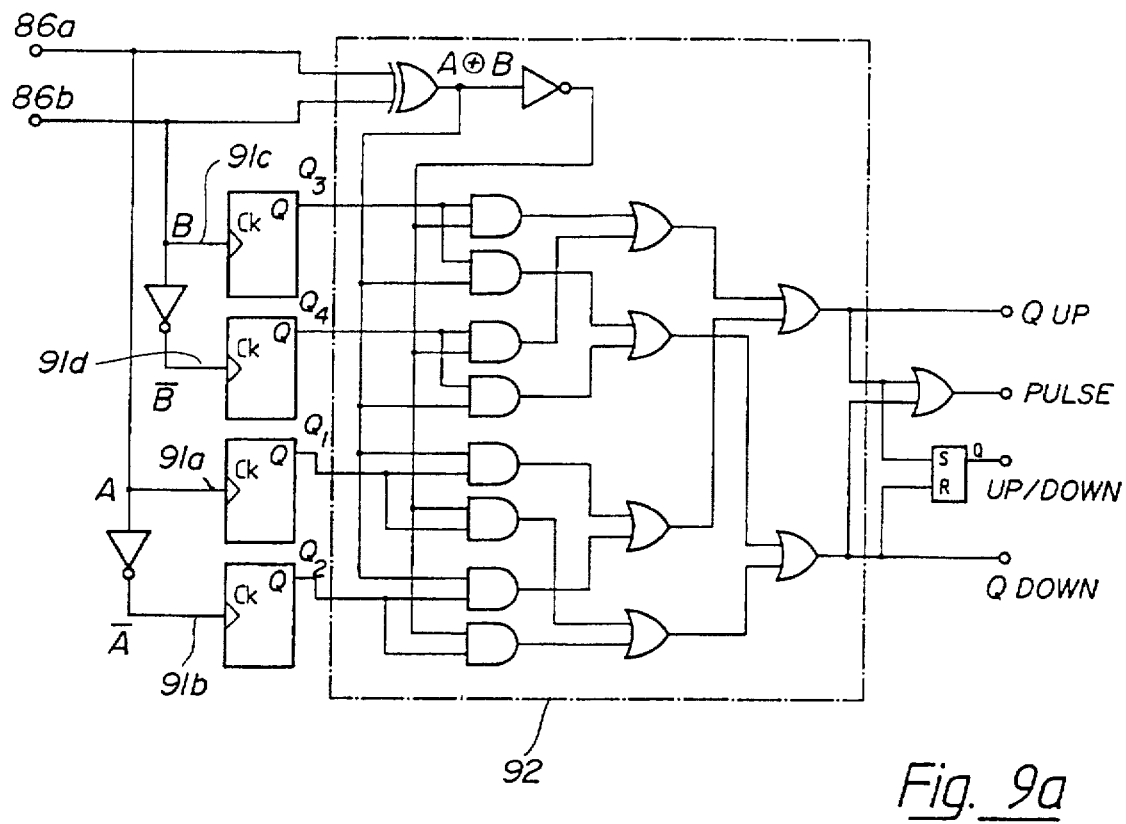
FIG. 9a shows the electrical diagram of a logical circuit for shaping the signals issued by the detection device or by the memory device.

FIG. 9a illustrates an embodiment of an incremental optical encoder comprising a shaping circuit for the signals derived from the detection device or, as shown in this figure, from the memory device.

In many applications these signals have in fact to be further processed for reconstituting a position information. In particular, in order to provide an absolute position information, an UP/DOWN counter device is used. The circuits currently used in this connection have an UP and a DOWN counter input. In order to adapt the signals supplied by the present encoder device to this type of counter, the encoder comprises an additional circuit as shown in FIG. 9a which is connected with its inputs to the outputs 86a, 86b of the memory device 84 of FIG. 8a and, at its output side, to the up/down counter.

The signals A, $\overline{A}$, B, and $\overline{B}$ which appear at the points designated by these references in FIG. 9a are, respectively, applied to the inputs 91a, 91b, 91c and 91d of four monostable trigger circuits which deliver pulses upon appearance of a positive edge in the respective input signals. A logical combinatory circuit which is formed by an assembly of gates 92 directs the pulses produced by the monostable trigger circuits, either towards an output Q UP or towards an output Q DOWN, depending on the direction of rotation of the movable member.

An additional output referenced PULSE is used to deliver a pulse on each transition of the signals A and B and another output referenced UP/DOWN delivers a signal related to the direction of rotation.

Figure 9B:
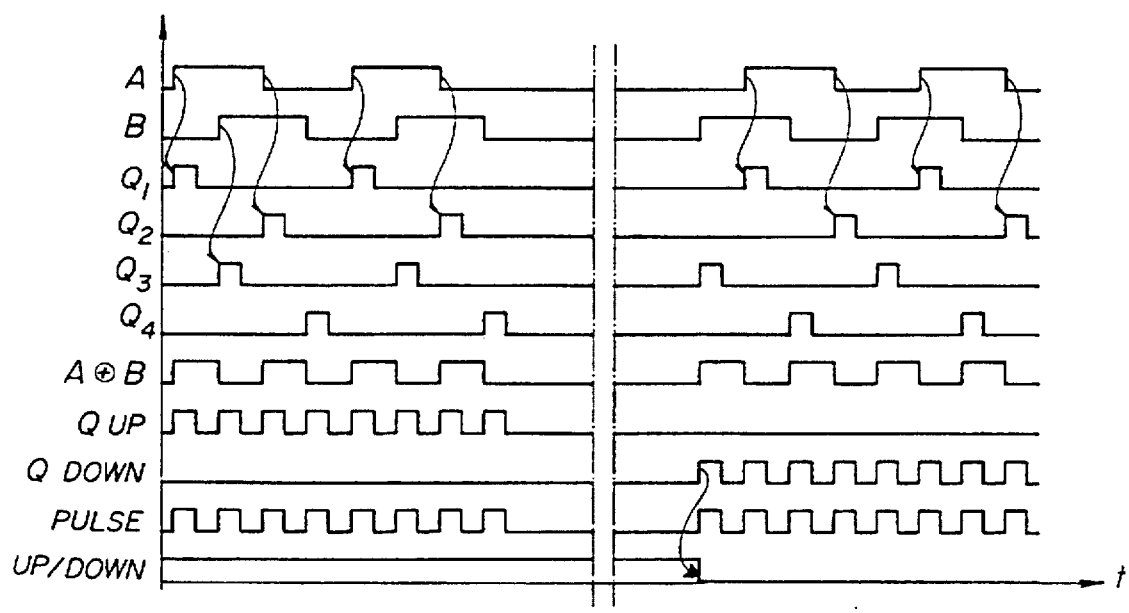

The logical states of the signals at various points of the circuit 9a are shown in the chronogram of FIG. 9b.

The embodiments described above with reference to an encoder for a rotative movement apply in a similar way to linear encoders which are used to provide information on a linear movement of a movable member.

What is claimed is:

1. An incremental optical encoder device for measuring an angle of rotation around an axis of a movable member as a function of time and for determining the direction of rotation of said member, comprising a light source emitting a light beam along an optical path, an encoder disc arranged coaxially with respect to said movable member and provided with a series of opaque zones and of light transmissive zones, said zones being arranged so as to cross said optical path and to modulate said light beam upon movement of said encoder disc, and detection means including at least one group of four light detectors, each detector having a light-sensitive surface arranged to receive the modulated light beam, each of said light-sensitive surfaces forming substantially a plane quadrilateral comprising two segments of concentric circles the centers of which are the point of intersection of the plane of said light-sensitive surface with the axis of rotation of said disc, said detection means being arranged for generating output signals in quadrature upon movement of said encoder plate, each of said light-sensitive surfaces comprising at least one zone covered by an opaque layer and an adjacent free zone in such a manner that said four light detectors generate the said output signals in quadrature, each light detector generating an output signal of a single phase.

2. An encoder device according to claim 1, wherein said opaque layer is made by metallization.

3. An incremental optical encoder device according to claim 1, wherein said encoder device further comprises memory means having inputs coupled to receive logical signals derived from said output signals from said detection means, said memory means being arranged for storing the states of said logical signals appearing at said inputs at the time said memory means receive a control signal, and for holding outputs of said memory means in the logical states corresponding to the stored logical states of said inputs.

4. An encoder device according to claim 3, and further comprising a circuit for interrupting energization of said light source under the action of said control signal.

5. An encoder device according to claim 3, and further comprising a circuit for interrupting energization of said detection means under the action of said control signal.

* * * * *

UNITED STATES PATENT AND TRADEMARK OFFICE
CERTIFICATE OF CORRECTION

PATENT NO. : 5,763,874
DATED : June 9, 1998
INVENTOR(S) : Luciano Antognini, et. al.

It is certified that error appears in the above-identified patent and that said Letters Patent is hereby corrected as shown below:

Title page, item [19], delete "Luciano" and insert --Antognini--.

[75], delete "Antognini Luciano" and insert --Luciano Antognini--.

Signed and Sealed this

Ninth Day of March, 1999

Attest:

Attesting Officer

Q. TODD DICKINSON

Acting Commissioner of Patents and Trademarks